Aug. 14, 1928.

O. C. TRAVER 1,680,708

RELAY

Original Filed Nov. 24, 1926

Inventor:
Oliver C. Traver,
by
His Attorney.

Patented Aug. 14, 1928.

1,680,708

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

RELAY.

Original application filed November 24, 1926, Serial No. 150,606. Divided and this application filed April 30, 1927. Serial No. 188,008.

My invention relates to improvements in relays, and more particularly to improvements in differential relays and has for an object to provide a relay in which a momentary contact controlling operation is effected as the movable element of the relay passes through an intermediate position.

This application is a division of my application, Serial No. 150,606, filed November 24, 1926, for synchronizing devices.

My invention will be better understood from the following description when considered in connection with the accompanying drawing, and its scope will be pointed out in the appended claims.

Figure 1:
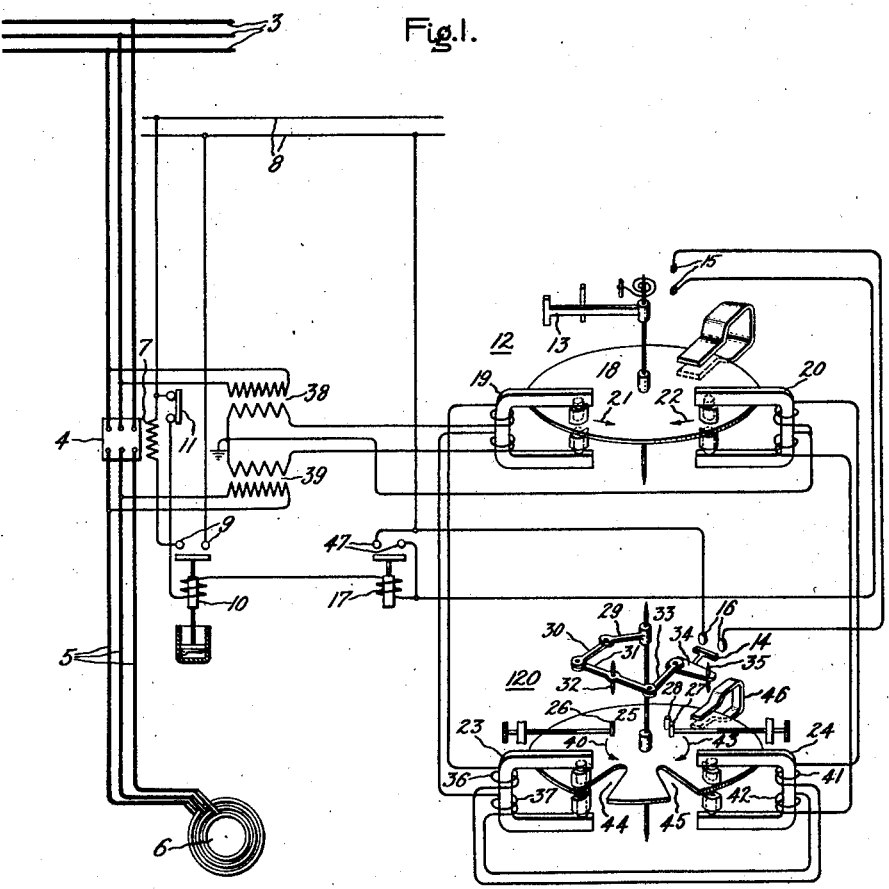
Figure 2:
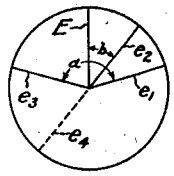

In the accompanying drawing, Fig. 1 illustrates diagrammatically a synchronizing device embodying my invention, and Fig. 2 is a vector diagram explanatory of the operation of the synchronizing device shown in Fig. 1.

For purposes of illustration, I have shown in Fig. 1 of the accompanying drawing an embodiment of my invention as applied to a synchronizing device for a three phase alternating current electric system comprising an alternating current circuit, such as a bus 3 to which may be connected, by any suitable switching means 4, another alternating current circuit 5 shown as comprising an alternator 6. The switching means 4 may be of the latched closed type, and, as shown comprises a closing coil 7 whose circuit is arranged to be energized from a control bus 8 through the contacts 9 of a control relay 10. Included in the circuit of the control relay 10 for opening the circuit thereof upon closure of the switching means 4, is an auxiliary switch 11 associated with the switching means and arranged to be closed when the switching means is open, and vice versa.

For controlling the control relay 10 and through this relay the switching means 4, so as to start the closing operation thereof in time to effect closure when the electromotive forces of the circuits 3 and 5 are substantially alike in phase and frequency, there may be provided as set forth in my aforesaid application, electroresponsive means controlled in accordance with the phase difference and the difference between the frequencies of the electromotive forces of the circuits 3 and 5 so that the closing operation of the switching means 4 is started only at a predetermined phase difference when the frequency difference is less than a predetermined value. The electroresponsive means shown comprises a plurality of differential relays 12 and 120, the latter of which represents an embodiment of my present invention. These relays are arranged respectively to control a plurality of circuit controlling members, such as movable contacts 13 and 14 which, in order to start the closing operation of the switching means, must simultaneously be in predetermined positions. For this purpose, the circuit controlling members 13 and 14 are arranged to control contacts 15 and 16 respectively, which are arranged in series in a control circuit including the control relay 10, an auxiliary relay 17 and the auxiliary switch 11 and arranged to be energized from the control bus 8.

The circuit controlling member 13 is arranged to be controlled in accordance with the difference between the vector sum of and the vector difference between the electromotive forces of the circuits 3 and 5 and to tend to move to circuit controlling or switch closing position during a predetermined range of phase difference, which may include phase coincidence, of the electromotive forces of the circuits. For this purpose, the circuit controlling member 13 may be actuated by a movable member, such as a conducting disk 18, which is arranged to have opposing torques exerted thereon by suitable electromagnetic means such as shaded pole motor elements 19 and 20 which tend to turn the disk 18 in the directions indicated by the arrows 21 and 22 respectively.

By suitably adjusting the motor elements 19 and 20, either of these elements can be arranged to predominate over the other throughout a predetermined range in the phase difference of the electromotive forces of the circuits 3 and 5 and the other element to predominate throughout the remainder of the phase difference range. For example, referring to Fig. 2 in which E is taken as a stationary vector representing the electromotive force of the bus 3 in a position considered as the in-phase condition, the motor element 19 may be arranged to predominate over the motor element 20 when the phase difference is anywhere within a predetermined range, herein shown as including phase coincidence and indicated by the angle $a$ between the vectors $e_1$ and $e_3$, which represent two instantaneous positions of the electromotive force $e$ of the circuit 5 relatively to E. Thus, whenever the phase difference is anywhere within the range represented by the angle $a$, the motor element 19 overcomes the restraint of the motor element 20 and tends to move the disk 18 in circuit closing direction. Outside of this range or in the angle $(360°-a)$, the motor element 20 overcomes the restraint of the motor element 19 and tends to move the disk 18 in the opposite direction.

The circuit controlling member 14, as shown, is arranged to be controlled in accordance with the difference between the vector sum of and the vector difference between corresponding electromotive forces of the circuits 3 and 5 and to be actuated substantially instantaneously on the occurrence of a predetermined phase difference near phase coincidence, such as indicated by the angle $b$ between E and $e_2$, within the range of phase difference indicated by the angle $a$ over which circuit closing operation of the circuit controlling member 13 may occur. For this purpose, the differential relay 120 which controls the circuit controlling member 14 comprises electromagnetic torque producing means such as shaded pole motor elements 23 and 24 arranged to exert opposing torques on a movable member such as a disk 25. This disk is arranged for movement between two positions, which are determined by adjustably positioned stops 26 and 27 against which a pin 28 on the disk abuts. The disk 25, in its movement from one position to another, is arranged to actuate the circuit controlling member 14 through a contact controlling mechanism such that, as the disk moves through an intermediate position, the circuit controlling member momentarily engages the contacts 16. For this purpose, the contact controlling mechanism may comprise, as shown, a toggle having a link 29 which is mounted to move with the disk 25 and a link 30 which is pivotally connected to a lever 31. This lever is mounted on a fixed pivot 32 and is pivotally connected to a link 33 which is pivotally connected to an arm or crank 34. This crank is mounted on a fixed pivot 35 and carries the circuit controlling member 14.

The motor element 23, as shown, comprises two windings 36 and 37 which are connected to be energized in accordance with corresponding electromotive forces of the circuits 3 and 5 respectively. For this purpose, the windings 36 and 37 may be connected to the secondaries of potential transformers 38 and 39 respectively whose primaries are connected across corresponding phases of the circuits 3 and 5 respectively. The windings 36 and 37 are so connected and arranged as to produce an electromagnetic effect dependent on the vector sum of the corresponding electromotive forces. This effect, manifested as a torque by virtue of the shaded poles, is therefore a maximum when the phase difference of the electromotive forces is zero, and a minimum when the phase difference is 180°. In the arrangement shown the torque of the motor element 32 tends to turn the disk in the direction indicated by the arrow 40. The motor element 24, as shown, also comprises two windings 41 and 42 which are connected to be energized in accordance with corresponding electromotive forces of the circuits 3 and 5 respectively. The windings 41 and 42 are so connected and arranged as to produce an electromagnetic effect dependent on the vector difference of the corresponding electromotive forces. This effect, manifested as a torque by virtue of the shaded poles, is therefore a minimum when the phase difference of the electromotive forces is zero, and a maximum when the phase difference is 180°. In the arrangement shown, the torque of the motor element 24 tends to turn the disk 25 in the direction indicated by the arrow 43. By suitable adjustment of the shaded poles of the motor elements 23 and 24, the former can be arranged to predominate over the latter at a predetermined phase difference such as indicated by the position of the electromotive force vector $e_2$ and vice versa for the position $e_4$, which may be substantially 180° from $e_2$. In order, however, to have a substantially instantaneous movement of the disk 25, the material thereof is so distributed, as for example, by cut away portions or slots 44 and 45, that when either motor element 23 or 24 predominates to start the disk, the torque of the stronger element is increased and the torque of the weaker element descreased, by reason of more of the disk being presented between the poles of the stronger element and less between the poles of the weaker element. In order to prevent unnecessary oscillation of the disk 25 and wear on the parts caused by such oscillation, a damping magnet 46 may be provided.

The toggle 29, 30 is so arranged that, in the extreme positions between which the disk 25 is movable, its effective lengths are the shortest. Then, as the disk 25 moves from one extreme position to an intermediate position, the toggle is moved from one side of its dead center position to the dead center position. The effective length of toggle is thereby increased to a maximum and the circuit controlling member 14 momentarily engages the contacts 16. As the disk 25 moves from this intermediate position to its other extreme position, the toggle is moved to the other side of its dead center position. The effective length of the toggle is thereby decreased and the circuit controlling member 14 is retracted.

Assuming the various parts positioned as shown in Fig. 1, and that it is desired to connect the alternator 6 to the bus 3, then as the phase difference between the electromotive forces of the bus and the alternator comes within a predetermined range indicated by the angle $a$ between the vectors $e_1$ and $e_3$, Fig. 2, the motor element 19 will predominate and close the contacts 13, 15 if the frequency is below a predetermined value. If the contacts 14, 16, which close momentarily at some predetermined phase difference $e_2$, close before the contacts 13 and 15 have closed, the switching means 4 will not be closed. If, however, the contacts 14, 16, close momentarily while contacts 13, 15 are closed, the control circuit, energized from the control bus 8 and comprising in series the contacts 14, 16, the contacts 13, 15, the auxiliary relay 17, the control relay 10 and the auxiliary switch 11, will be completed. This effects the energization of the control relay 10, and through its contacts 9, the energization of the closing coil 7 to start the closing operation of the switch 4. The auxiliary relay 17, when energized, closes its own circuit through its contacts 47 so that the control relay 10 remains energized until the auxiliary switch 11 opens, even though the contacts 14, 16 are closed but momentarily. While the contacts 14, 16 may be closed momentarily when the phase difference is that indicated by the vector $e_4$, the closing operation of the switch 4 cannot then be started, since $e_4$ is within the range $(360° - a)$, where the contacts 13, 15 cannot be closed.

While I have shown and described only one embodiment of my invention, I do not desire to be limited to the exact arrangement shown and described, but seek to cover in the appended claims, all those modifications that fall within the true spirit and scope of my invention.

What I claim as new and desire to secure by Letters Patent of the United States, is:—

1. A differential relay comprising relatively movable cooperating contacts, a member movable between two positions, electromagnetic means for moving the member arranged to exert opposing torques thereon, and contact controlling mechanism arranged to be actuated on movement of the member due to an unbalance of the torques exerted thereon for effecting a momentary closure of the contacts as the member moves through an intermediate position.

2. A differential relay comprising relatively movable cooperating contacts, a member movable between two positions, electromagnetic means for moving the member arranged to exert opposing torques thereon, and contact controlling mechanism comprising a toggle arranged to be actuated from one side of the dead center position to the other on an unbalance of the torques exerted on the member for effecting a momentary circuit closure of the contacts as the toggle is moved through the dead center position.

3. A relay comprising relatively movable cooperating contacts, a member movable between two positions, means comprising an electromagnet for moving the member, and contact controlling mechanism comprising a toggle arranged to be actuated from one side of the dead center position to the other on movement of the member between said two positions for effecting a momentary circuit controlling operation of the contacts as the toggle is moved through the dead center position.

4. A relay comprising relatively movable cooperating contacts, a member arranged for movement between two positions in either of two opposite directions, means for limiting the movement of said member in each of said directions, electromagnetic means for moving the member arranged to exert opposing forces thereon, and contact controlling mechanism arranged to be actuated on movement of the member due to an unbalance of the forces exerted thereon for effecting the momentary closure of the contacts as the member moves in either direction through an intermediate position.

5. A relay comprising relatively movable cooperating contacts, a member arranged for a limited movement in each of two opposite directions, opposing elements respectively tending to move said member in said directions, and contact controlling mechanism arranged to be actuated when one of said elements predominates over the other to move the member for effecting a momentary closure of the contacts as the member moves through an intermediate position in either of said directions.

In witness whereof, I have hereunto set my hand this 29th day of April 1927.

OLIVER C. TRAVER.